(12) United States Patent
Beaujot

(10) Patent No.: US 10,806,069 B2
(45) Date of Patent: Oct. 20, 2020

(54) RESIDUE FLOW THROUGH HOE TYPE SEEDING IMPLEMENTS

(71) Applicant: SEEDMASTER MANUFACTURING LTD., Emerald Park (CA)

(72) Inventor: Norbert Beaujot, Saskatchewan (CA)

(73) Assignee: SeedMaster Manufacturing Ltd., Saskatchewan (CA)

(*) Notice: Subject to any disclaimer, the term of this patent is extended or adjusted under 35 U.S.C. 154(b) by 211 days.

(21) Appl. No.: 15/567,709

(22) PCT Filed: Apr. 25, 2016

(86) PCT No.: PCT/CA2016/000127
§ 371 (c)(1),
(2) Date: Oct. 19, 2017

(87) PCT Pub. No.: WO2016/172786
PCT Pub. Date: Nov. 3, 2016

(65) Prior Publication Data
US 2018/0098484 A1 Apr. 12, 2018

(30) Foreign Application Priority Data

Apr. 29, 2015 (CA) ........................... 2889850

(51) Int. Cl.
| | |
|---|---|
| *A01C 5/06* | (2006.01) |
| *A01C 7/00* | (2006.01) |
| *A01B 49/06* | (2006.01) |
| *A01C 7/20* | (2006.01) |
| *A01G 22/00* | (2018.01) |
| *A01C 7/06* | (2006.01) |

(52) U.S. Cl.
CPC .............. *A01C 7/006* (2013.01); *A01B 49/06* (2013.01); *A01C 5/064* (2013.01); *A01C 7/205* (2013.01);
(Continued)

(58) Field of Classification Search
CPC ......... A01C 5/062; A01C 5/064; A01C 7/006; A01C 7/201; A01B 21/00; A01B 21/02;
(Continued)

(56) References Cited

U.S. PATENT DOCUMENTS

| | | | | |
|---|---|---|---|---|
| 2,826,133 | A * | 3/1958 | Moss ...................... | A01B 49/04 172/65 |
| 3,429,379 | A * | 2/1969 | Tebben .................. | A01B 39/26 172/510 |

(Continued)

FOREIGN PATENT DOCUMENTS

| | | |
|---|---|---|
| CA | 2074765 | 1/1994 |
| CA | 2642567 | 5/2009 |
| CA | 2695738 | 6/2010 |

OTHER PUBLICATIONS

International Search Report for PCT/CA2016/000127 dated Jul. 28, 2016, 3 pages.

*Primary Examiner* — Alicia Torres
(74) *Attorney, Agent, or Firm* — Nixon & Vanderhye P.C.

(57) ABSTRACT

A residue clearing apparatus for a seeding implement includes a plurality of ground driven residue wheel pairs, each movably and rotatably mounted to the seeding implement with right and left residue wheels on corresponding right and left sides of one of the shanks such that each residue wheel pair moves vertically independent of the shanks. Residue contact members connected to each residue wheel engage the ground surface adjacent to one of the shanks to rotate the residue wheel. Outer ends of the residue contact members pass forward of the shank above the furrow opener. A raising system operative to raise the residue wheel pairs to a wheel transport position.

30 Claims, 7 Drawing Sheets

(52) U.S. Cl.
CPC ............... *A01C 5/062* (2013.01); *A01C 7/06* (2013.01); *A01C 7/203* (2013.01); *A01G 22/00* (2018.02); *Y02P 60/23* (2015.11)

(58) Field of Classification Search
CPC ..... A01B 21/08; A01B 21/086; A01B 79/005; A01B 49/06
See application file for complete search history.

(56) References Cited

U.S. PATENT DOCUMENTS

| | | | | |
|---|---|---|---|---|
| 4,485,878 | A | * | 12/1984 | Uken ..................... A01B 39/26 172/156 |
| 5,222,562 | A | * | 6/1993 | Roiger ................... A01B 39/26 172/120 |
| 5,333,694 | A | * | 8/1994 | Roggenbuck .......... A01B 49/02 172/156 |
| 5,349,911 | A | | 9/1994 | Holst et al. |
| 5,619,939 | A | | 4/1997 | Herman et al. |
| 5,623,997 | A | * | 4/1997 | Rawson ................. A01B 35/18 172/156 |
| 5,782,307 | A | * | 7/1998 | Forsyth ................ A01C 23/025 172/156 |
| 6,345,671 | B1 | | 2/2002 | Siemens et al. |
| 6,688,243 | B1 | | 2/2004 | Buchholtz |
| 7,104,205 | B2 | | 9/2006 | Beaujot |
| 7,410,005 | B2 | * | 8/2008 | Lung ..................... A01C 5/066 111/156 |
| 8,408,324 | B2 | | 4/2013 | Dillon |

\* cited by examiner

RESIDUE FLOW THROUGH HOE TYPE SEEDING IMPLEMENTS

This application is the U.S. national phase of International Application No. PCT/CA2016/000127 filed Apr. 25, 2016 which designated the U.S. and claims priority to CA 2,889,850 filed Apr. 29, 2015, the entire contents of each of which are hereby incorporated by reference.

This disclosure relates to the field of agricultural implements and in particular facilitating residue flow through seeding implements with hoe-type furrow openers.

BACKGROUND

Seeding into the residue of a previous crop is an ongoing challenge in the trend to minimum tillage farming practices. In minimum tillage or no-till farming the soil is not plowed or other-wise cultivated to turn the residue from the previous crop under and leave a relatively clear ground surface in which to place seed and fertilizer for the next crop. Especially where the previous crop, and thus the residue therefrom, was particularly heavy, or where the residue was not properly spread, the residue can be problematic for seeding implements.

Seed and fertilizer furrow openers are essentially either disk type openers or hoe type openers. Disk type openers can be forced up out of the ground by a particularly heavy mat of residue, and also the residue often gets pushed down into the furrow and pinned there by the disk in operation, creating a poor seedbed amongst the pinned straw. U.S. Pat. No. 5,619,939 to Herman et al. discloses a disk furrow opener assembly which provides presser wheels ahead of and on each side of the disk which press the straw and trash in place against the soil surface at just the right time to allow the disc of the disc opener to cut through, providing a clean seed furrow.

On hoe type openers the residue tends to lodge on the shank of the opener and build up and hamper soil flow, seed depth, packing and ultimately can plug the seeder with large clumps. If large clumps stay balanced or wrapped on the shank the clump can continue growing in size until the drill becomes plugged with straw to the extent that it will no longer function. Even if the clumps fall off, they remain on the field surface hampering later operations, and reducing emergence and crop uniformity.

Hoe type seeders for no-till operations have therefore been designed to provide more room for the straw and residue to move through between the hoe openers and between the frame and the ground. This has been done by increasing the spacing between the hoe openers, and thereby increasing the row spacing to 10, 12 or even 14 inches which is about the maximum spacing possible for these crops, and further by increasing the number of fore and aft spaced rows of hoe openers and thereby increasing the lateral spacing between the hoe openers on a row. Since the residue climbs up the shanks as it builds up before falling off, the length of the hoe opener shanks has also been increased to increase the distance between the seeder frame and the ground.

Such seeder design features have improved residue flow, but have not alleviated the problem. High-energy consuming practices are often resorted to by farmers to minimize residue related seeding problems. Farmers often cut the stubble low and do a fine chop and aggressive spread of the straw going thru the combine. Cutting the crop low however reduces moisture utilization due to increased evaporation and reduced snow catch. No-till has become popular in the semi-arid regions because of the moisture saving results, and wasting moisture in semi-arid agriculture can be costly. Another practice is to use heavy harrows after harvest to help break-up and distribute the straw more evenly. This practice is also high in fuel consumption; capital expenditure, manpower, maintenance as well as results in more weed growth and reducing moisture utilization.

For these reasons a wide variety of other methods and equipment has been developed to deal with the issue. U.S. Pat. No. 5,349,911 to Holst et al. discloses residue clearing apparatus where one or more spoke type wheels are in contact with the ground running at a slight angle to the direction of travel in front of the opener such that the residue is dragged sideways out of the path of the opener. Generally the wheel rotation is powered by the spokes being in contact with the ground. This type of residue clearing is somewhat successful with disk type openers but is rarely used on hoe type openers. It tends to be expensive to maintain and in many cases does not produce the desired result. It is also not particularly effective with straw that is long and/or still rooted to the ground.

U.S. Pat. No. 8,408,324 to Dillon has a rotating finger wheel in front of the shank oriented so the ends of the rotating fingers pass close to the front of the shank and move crop residue off the shank. Similarly Canadian Patent Number 2,629,476 to the present inventor Beaujot discloses a clearing member mounted adjacent to the shank, and an actuator operative to move the residue clearing member into contact with a clump of residue on one side of the shank and move it towards the other side so it falls off.

U.S. Pat. No. 6,688,243 to Buchholtz discloses pairs of residue control wheels on each side of, and closely adjacent to, the shank. Straws dragging from the shank on each side are pinned under the wheels and pulled rearward off the shank. Where each wheel contacts opposite ends of the same straw wrapped around the shank the straw will be pulled apart with portions falling to each side. The build-up of residue on the front of the shank is thus reduced. Similarly U.S. Pat. No. 6,345,671 to Siemens et al. discloses a ground driven finger wheel located beside the furrow opener which pins the residue to the ground preventing same from lodging on the furrow opener.

Canadian Patent Application Number 2,074,765 of Hulicsko discloses a trash clearing system with a pair of rotating tined plates or wheels driven by a chain and sprocket connected to ground driven packer wheels. The tined wheels are positioned close to each side of the shank and move rearward adjacent to the shank. As the tined wheels rotate they contact straws lodged on the shank that extend laterally from each side of the shank into the path of the tines moving past the edges of the shank. The tines on each side are offset from each other such that they alternately pull rearward on the straws extending laterally from each side of the shank, first on one side and then on the opposite side.

U.S. Pat. No. 7,104,205 to the present inventor Beaujot discloses a furrow opener assembly with slightly offset front and rear shanks and a residue deflector mounted on the front shank and configured to direct residue to one side of the front shank away from the path of the following rear shank.

SUMMARY OF THE INVENTION

The present disclosure provides a residue clearing apparatus for an agricultural implement that overcomes problems in the prior art.

In a first embodiment the present disclosure provides a residue clearing apparatus for a seeding implement, where the seeding implement comprises a plurality of shanks substantially equally spaced along a width of a frame of the seeding implement and a hoe type furrow opener mounted on a bottom end of each shank and configured to engage a ground surface. The apparatus comprises a plurality of residue wheel pairs, each residue wheel pair comprising a right residue wheel and a left residue wheel mounted to corresponding right and left ends of a rigid axle. Each axle is adapted to be movably and rotatably mounted to the seeding implement with the right and left residue wheels on corresponding right and left sides of one of the shanks such that each residue wheel pair moves up and down independent of the shanks. A plurality of residue contact members is connected to each residue wheel and configured to engage the ground surface adjacent to the one of the shanks to rotate the residue wheels, and outer ends of the residue contact members pass forward of the shank above the furrow opener. A raising system is operative to raise the residue wheel pairs to a wheel transport position.

In a second embodiment the present disclosure provides a seeding apparatus comprising a plurality of shanks substantially equally spaced along a width of a frame of a seeding implement and a hoe type furrow opener mounted on a bottom end of each shank and configured to engage a ground surface. A plurality of residue wheel pairs each comprises a right residue wheel and a left residue wheel mounted to corresponding right and left ends of a rigid axle Each axle is movably and rotatably mounted to the seeding implement with the right and left residue wheels on corresponding right and left sides of one of the shanks such that each residue wheel pair moves up and down independent of the shanks. A plurality of residue contact members is connected to each residue wheel and configured to engage the ground surface adjacent to the one of the shanks to rotate the residue wheels, and outer ends of the residue contact members pass forward of the shank above the furrow opener. A raising system is operative to raise the residue wheel pairs to a wheel transport position.

The disclosed residue clearing apparatus improves the flow of residue between shanks of a seeding implement. Shanks can be spaced closer together significantly reducing the cost and complexity of the seeding implement.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
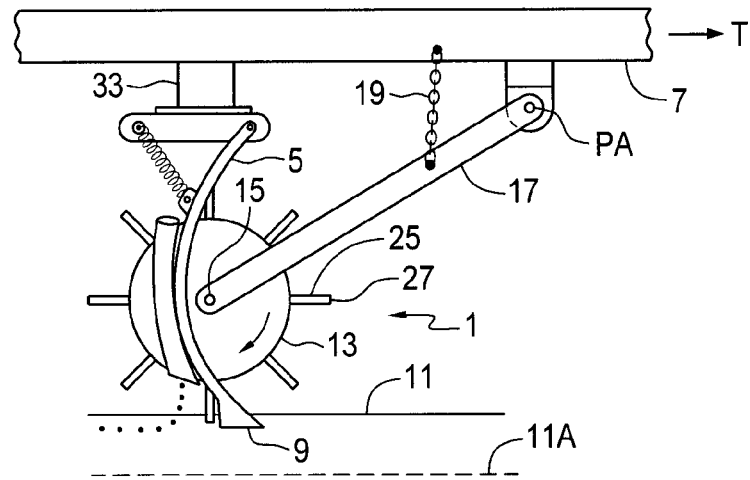
FIG. 1 is a schematic sectional view along line 1-1 in FIG. 2 of an embodiment a residue clearing apparatus of the present disclosure for a seeding implement.
Figure 2:
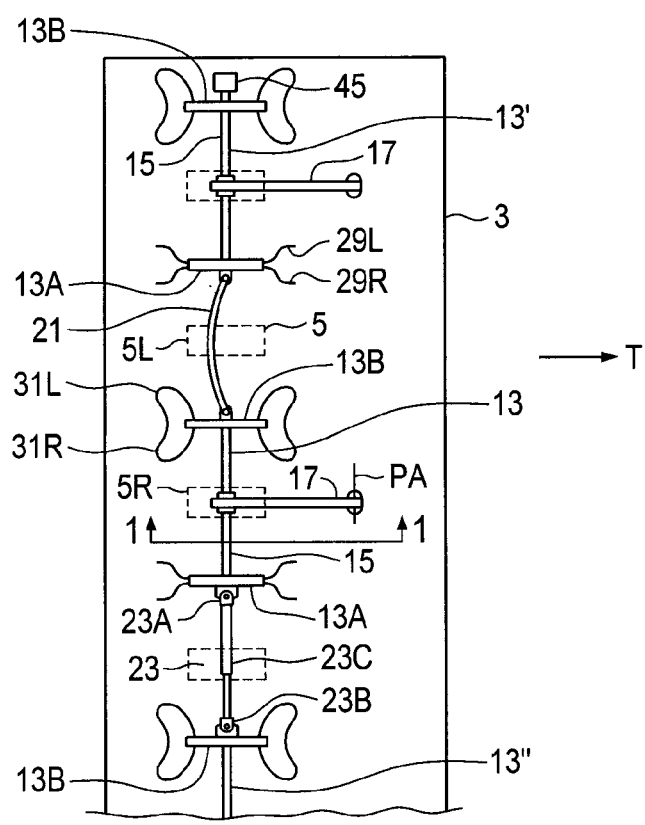
FIG. 2 is a schematic top view of the embodiment of FIG. 1.

FIGS. 1 and 2 schematically illustrate an embodiment of a residue clearing apparatus 1 of the present disclosure for a seeding implement 3, where the seeding implement comprises a plurality of shanks 5 substantially equally spaced along a width of a frame 7 of the seeding implement 3 and a hoe type furrow opener 9 mounted on a bottom end of each shank 5 and configured to engage a ground surface 11 as the seeding implement 3 moves in the operating travel direction T.

The apparatus 1 comprises a plurality of ground driven residue wheel pairs 13. Each residue wheel pair comprising a right residue wheel 13A and a left residue wheel 13B mounted to corresponding right and left ends of a rigid axle 15. Each axle 15 is movably and rotatably mounted to the seeding implement 3 with the right and left residue wheels 13A, 13B on corresponding right and left sides of one of the shanks 5 such that each residue wheel pair 13 moves up and down independent of the shanks 5.

In the illustrated apparatus 1, the axle 15 is rotatably mounted in the bottom end of a wheel arm 17. A front end of the wheel arm 17 is pivotally attached about a pivot axis PA to the frame 7 allowing the axle 15 to rotate and move up and down.

A raising system is operative to raise the residue wheel pairs 13 to a wheel transport position. Here the raising system is configured such that when the shanks 5 are moved to a shank transport position the residue wheel pairs 13 are automatically moved to a wheel transport position. The wheel arm 17 is connected to the frame 7 at a mid-point thereof by an arm chain 19 configured to allow the wheel arm 17 and attached residue wheel pair 13 to move up and down to follow the ground surface 11 when in the illustrated operating position, and configured so that raising the shanks 5, which in the illustrated implement 3 is accomplished by raising the frame 7, to a shank transport position causes the arm chain 19 to tighten and raise the residue wheel pair 13 to a wheel transport position above the ground surface 11A indicated by the phantom line. It is contemplated that other mechanisms can also be used to automatically raise the residue wheel pairs to the wheel transport position when the shanks 5 are raised to the shank transport position.

The residue wheel pairs 13 can be connected by a driveline along at least a portion of the width of the seeding implement 3. In FIG. 2 it is seen that a flexible tether, illustrated as a heavy cable 21, is connected at one end thereof to the left residue wheel 13B of residue wheel pair 13 opposite the axle 15 and is connected at an opposite end thereof to the right residue wheel 13A' of the adjacent residue wheel pair 13'. Rotation of the wheel pair 13 imparts a rotational force through the cable 21 to rotate the other wheel pair 13', and vice versa.

Similarly the right residue wheel 13A of the residue wheel pair 13 is connected to the left wheel 13B of the next adjacent residue wheel pair 13" by a universal joint assembly 23 comprising a first universal joint 23A connected to the right residue wheel 13A of the residue wheel pair 13 and a second universal joint 23B connected to the left residue wheel 13B of the adjacent residue wheel pair 13", and a telescoping shaft 23C connecting the first and second universal joints 23A, 23B.

The driveline using the illustrated flexible cable 21 and universal joint assembly 23 allows residue wheel pairs 13, 13', 13" to move up and down independent of each other, while assisting rotation of each other and reduces the occurrence of one residue wheel pair 13 becoming jammed on a clump of trash or the like. The rotational force exerted on each connected residue wheel pair 13 by engagement with the ground surface 11 is transferred to adjoining residue wheels 13. Depending on the width of the implement all the residue wheel pairs 13 may be connected together by the driveline.

A plurality of residue contact members 25 is connected to each residue wheel 13A, 13B and the residue contact members 25 are configured to engage the ground surface 11 adjacent to one of the shanks 5 to rotate the residue wheel 13A, 13B. Outer ends 27 of the residue contact members 25 pass forward of the shank 5 above the furrow opener 9 and thus contact crop residue that may be gathered on the front face of the shank 5 and extending laterally from the shank 5.

Figure 7:
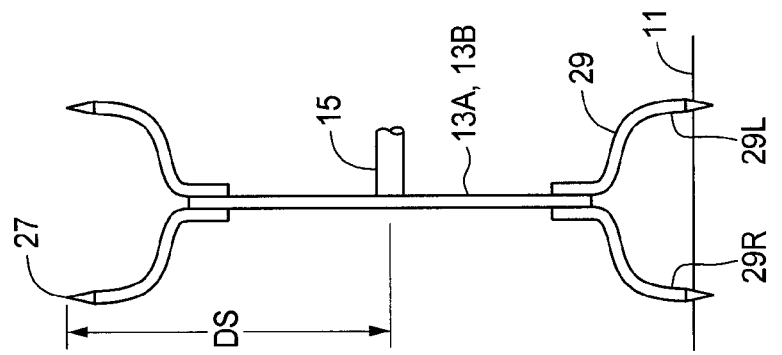
FIG. 7 is a front view of the residue wheel of FIG. 5 where the residue contact members are provided by a pair of spikes.
Figure 6:
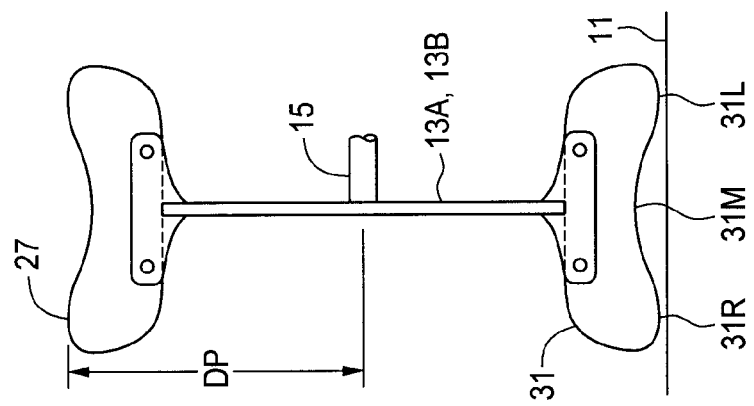
FIG. 6 is a front view of the residue wheel of FIG. 5 where the residue contact members are provided by paddles.
Figure 5:
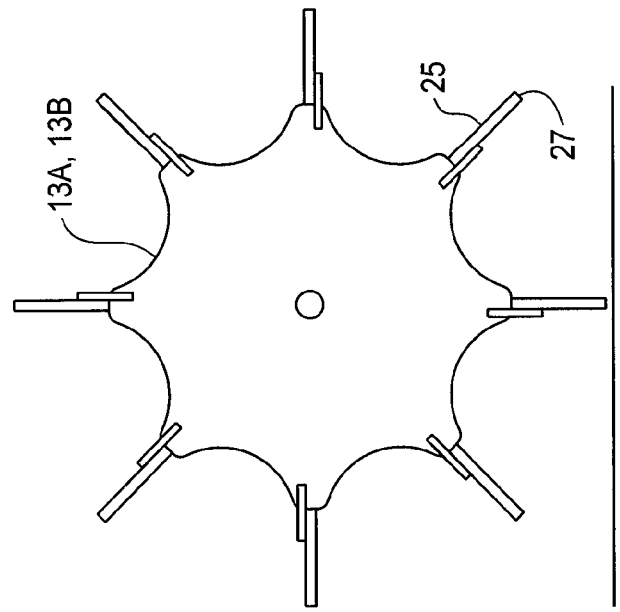
FIG. 5 is a schematic side view of the residue wheel of the embodiment of FIG. 1.

As schematically illustrated in FIGS. 5-7, the residue contact members 25 can be provided by right and left spikes 29R, 29L or by a paddle 31 extending outward from a periphery of the residue wheels 13A, 13B. The illustrated paddle 31 has an outer end 27 that is curved and oriented such that a center portion 31M thereof is above right and left portions 31R, 31L thereof that engage the ground surface 11. The paddle 31 could also have simply a straight outer end 27, but it is contemplated that the curved outer end 27 will put added downward force closer to the shanks 5 to more aggressively pin residue to the ground surface and prevent same from dragging on the shanks 5. The residue contact members 25 are typically resilient, made from stiff plastic, rubber or the like to resist deformation by rocks and the like.

In a common application, the residue contact members on one residue wheel 13A will comprise a plurality of the illustrated paddles 31 and the residue contact members on the other residue wheel 13B comprise a plurality of spikes 29. The spikes 29 will be somewhat longer than the paddles so that a distance DS from the axle 15 to outer ends 27 of the spikes 29 is greater than a distance from the axle 15 to outer ends 27 of the paddles 31. The spikes will then extend somewhat farther into the ground surface 11 and provide added rotational force on the axle to assist in rotating the other residue wheel with the paddles 31.

The illustrated seeding implement 3 comprises right and left adjacent shanks 5R, 5L mounted on a lateral frame member 33. The frame has been removed in FIG. 2 and the shanks 5 are shown in phantom lines to allow clear illustration of the residue clearing apparatus 1. The residue contact members 25 are illustrated as alternating paddles 31 and double spikes 29. Each residue contact member 25 comprises a right portion 29R, 31R adjacent to a left side of the right shank 5R and a left portion 29L, 31L adjacent to a right side of the left shank 5L.

Figure 3:
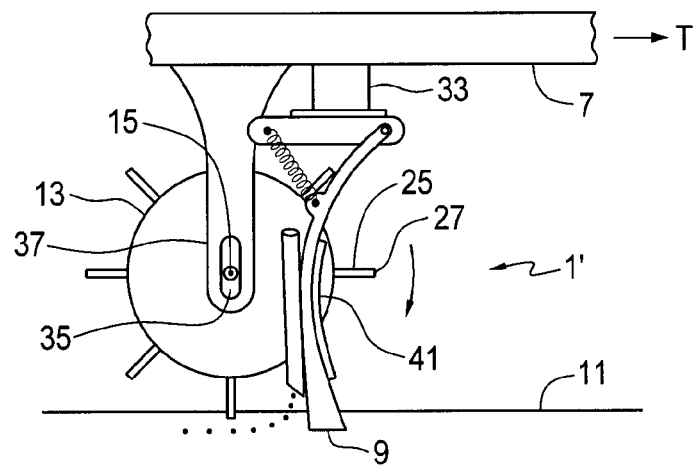
FIG. 3 is a schematic sectional view along line 3-3 in FIG. 4 of an alternate embodiment a residue clearing apparatus of the present disclosure for a seeding implement.
Figure 4:
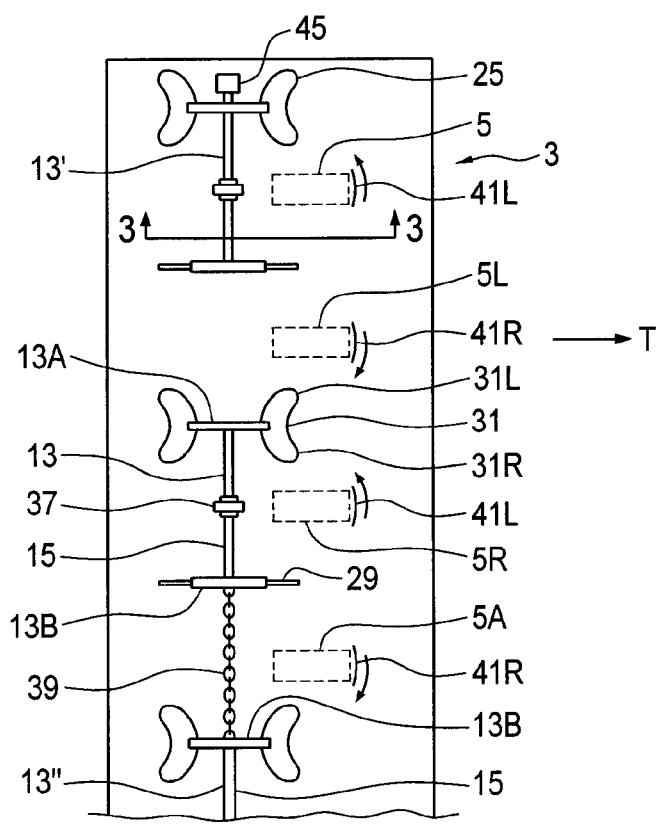
FIG. 4 is a schematic top view of the embodiment of FIG. 3.

FIGS. 3 and 4 schematically illustrated an alternate embodiment of the residue clearing apparatus 1' of the present disclosure with a different system for mounting the residue wheel pairs 13 on the seeding implement 3. Here the axle 15 of the residue wheel pair 13 is rotatably mounted in a slot 35 defined in an axle bracket 37 that extends down from the frame 7 of the implement 3. Here as well the axle 15 and flexible tether provided here by a wheel chain 39, runs across the width of the implement 3 behind the shanks 5. The outer ends 27 of the residue contact members 25 contact the soil surface 11 at a location that is more rearward than the contact point of the residue contact members 25 of the apparatus 1 described above.

In the apparatus 1 described above the driveline is shown connecting each residue wheel pair 13 to the adjacent residue wheel pair 13, while in the apparatus 1' the residue wheel pair 13' is not connected to the adjacent residue wheel pair 13, but the residue wheel pair 13 is connected by wheel chain 39 to the adjacent residue wheel pair 13".

The apparatus 1' also illustrates a left deflecting shield 41L mounted on the right shank 5R and operative to direct residue toward a left side of the right shank 5R, and a first right deflecting shield 41R mounted on the left shank 5L and operative to direct residue toward a right side of the left shank 5L. Residue contact members are provided by paddles 31 mounted on the residue wheel 13A. The paddles 31 include a right portion 31R adjacent to the left side of the right shank 5R and a left portion 31L adjacent to the right side of the left shank 5L. The paddles 31 extend outward from a periphery of the first residue wheel 13A rotating between the right and left shanks 5R, 5L and engage the ground surface adjacent to the left side of the right shank 5R and adjacent to the right side of the left shank 5L.

A third shank 5A is mounted on the lateral frame member to the right of the right shank 5R, and a second right deflecting shield 41R is mounted on the third shank 5A and is operative to direct residue toward a right side of the third shank 5A. Residue contact members 25 mounted on a second residue wheel 13B, engage the ground surface between the right shank 5R and the third shank 5A. The residue contact members on the second residue wheel 13A comprise single spikes 29 oriented to roll along a line that is substantially equally spaced between the right shank 5R and the third shank 5A.

With the deflector shields 41R, 41L arranged as illustrated, significantly more residue is directed to the area between the right and left shanks 5R, 5L, and less is directed to the area between the right shank 5R and the third shank 5A. The paddles 31 on the residue wheel 13A between the right and left shanks 5R, 5L aggressively pin this residue to the ground and move it rearward off the face of the shanks. The spikes 29 on the residue wheel 13B between the right and third shanks 5R, 5A have a reduced volume of residue to move and pin. The spikes 29 are longer than the paddles 31 and penetrate the ground surface to a greater degree providing added rotational force on the residue wheel 13B which is transferred through the axle 15 to the other residue wheel 13A.

In the illustrated seeding implement 3 shown in FIGS. 2 and 4 all the shanks 5 are mounted on the same lateral frame member 33 oriented perpendicular to the operating travel direction T. The residue clearing apparatuses 1, 1' effectively clear residue from the shanks 5 and allow the shanks 5 to be spaced closer together in a single row on the single lateral frame member 33, or in 2 rows on front and rear lateral frame members instead of on three or four rows as is common in the present art.

As seen in FIGS. 1 and 3 each residue wheel pair 13 is biased toward the ground surface only by weight. Weight can be added or taken off the axle 15 or the wheels 13A, 13B to change the bias force if desired. Springs or like bias elements are thus not required.

It is contemplated that for good results the residue contact members 25 will engage the ground surface rearward of the corresponding adjacent furrow opener 9.

A residue wheel drive, such as a hydraulic motor or electric motor 45 can be connected to the driveline to exert a rotational force on the driveline to assist in rotating the connected residue wheels 13A, 13B.

Figure 8:
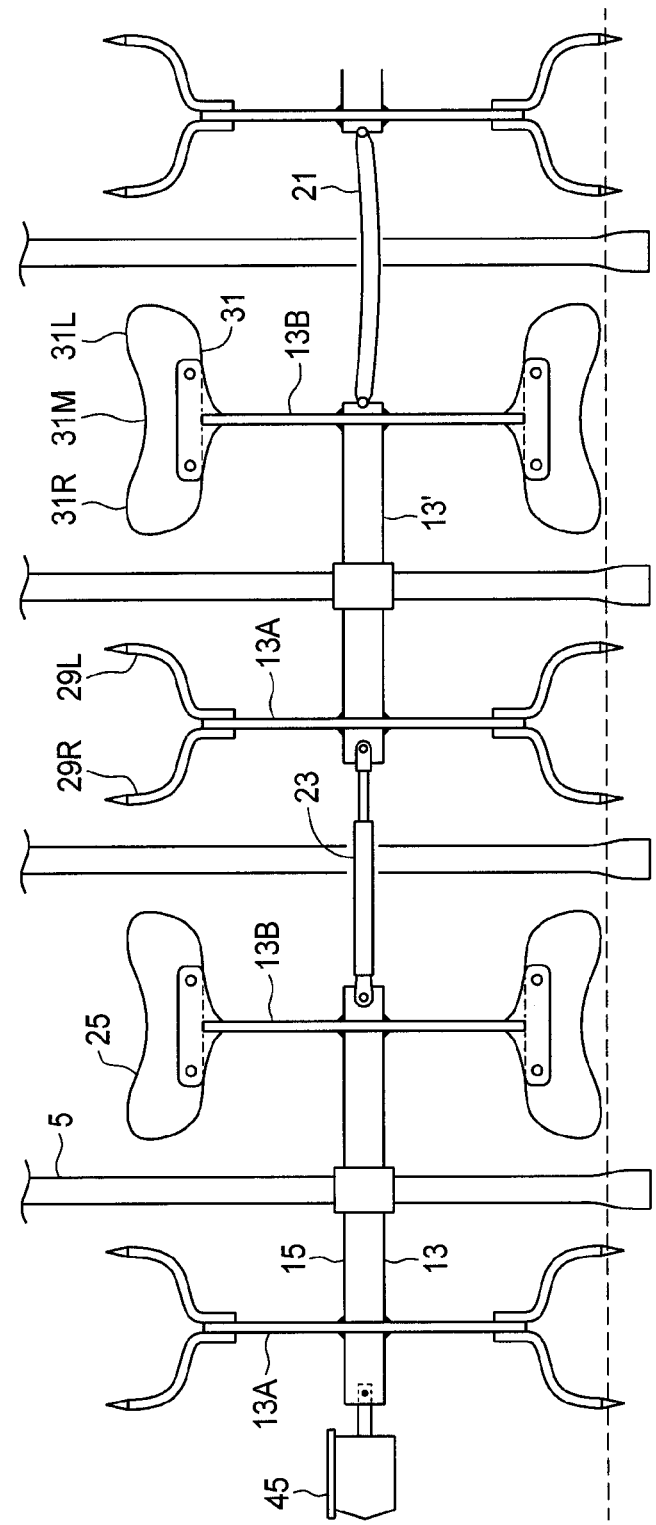
FIG. 8 is a schematic front view of the embodiment of FIG. 1 mounted on the seeding implement.

FIG. 8 schematically illustrates a front view of two residue wheel pairs 13, 13' connected by a universal joint assemblies 23, and a flexible drive cable 21 connecting the residue wheel pair 13' with the next adjacent residue wheel pair. The residue contact members 25 are shown as paddles 31 and double spikes 29.

Figure 9:
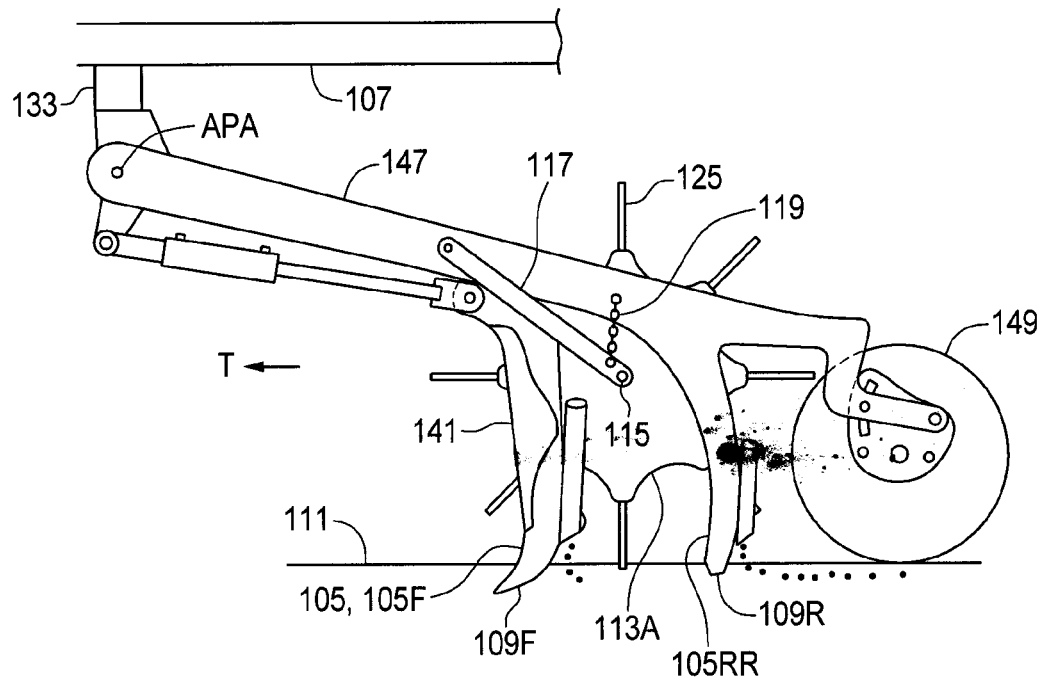
FIG. 9 is a schematic side view of an alternate embodiment a residue clearing apparatus of the present disclosure for a seeding implement mounted on an opener arm that also supports front and rear shanks and corresponding furrow openers where the residue wheel pairs are supported on a wheel arm.
Figure 10:
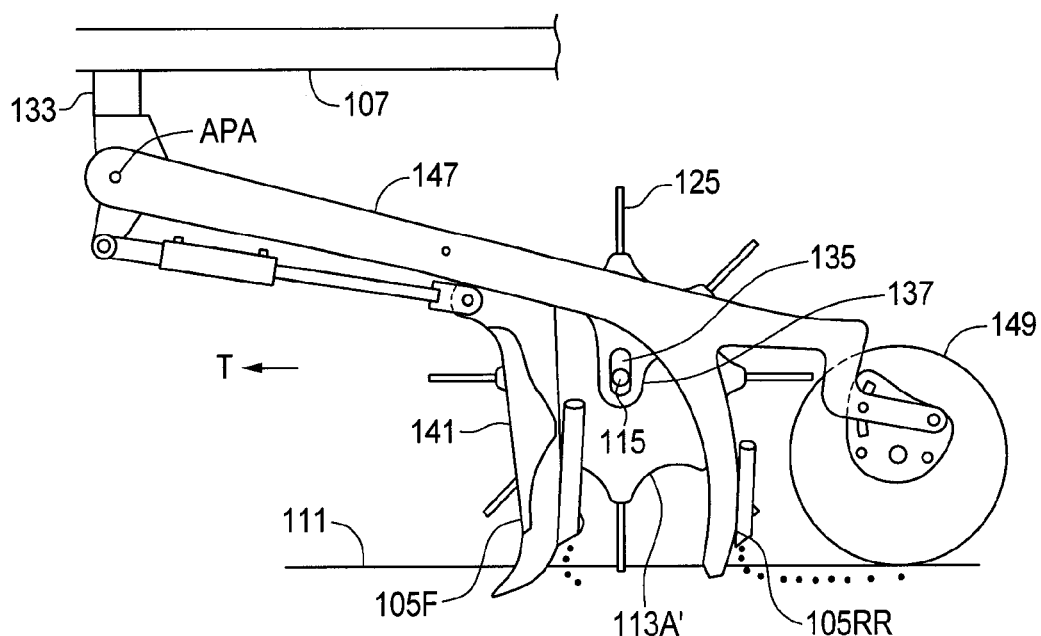
FIG. 10 is a schematic side view of a further alternate embodiment a residue clearing apparatus of the present disclosure for a seeding implement mounted on an opener arm that also supports front and rear shanks and corresponding furrow openers where the residue wheel pairs are supported in a slotted bracket attached to the opener arm.

FIGS. 9 and 10 schematically illustrate the shanks 105 mounted on opener arms 147 equally spaced along a width of the lateral frame member 133 of the frame 107. Each arm 147 is pivotally attached to the frame member 133 about arm pivot axis APA such that the arm 147 can move up and down and a packer wheel 149 supports the rear end of the arm 147. Front and rear shanks 105F, 105RR with corresponding front and rear hoe type furrow openers 109F, 109R mounted to bottom ends thereof are mounted to each arm 147, and the residue contact members 125 on the residue wheel 113A engage the soil surface 111 between the front and rear hoe type furrow openers 109F, 109R.

In the embodiment illustrated in FIG. 9 the residue wheel pair, illustrated here only with the right residue wheel 113A is movably and rotatably mounted to the opener arm 147 by a wheel arm 117 rotatably connected at a bottom end thereof to a mid-point of the axle 115, and pivotally connected at a top end thereof to the arm 147. The wheel arm 117 is connected at a mid-point thereof to the opener arm 147 by an arm chain 119 configured to allow the wheel arm 117 and attached residue wheel pair to move up and down to follow the ground surface 111 when in the illustrated operating position, and configured so that raising the shanks 105, which in the illustrated embodiment is accomplished by raising the opener arm 147, to a shank transport position causes the arm chain 119 to tighten and raise the residue wheel pair to a wheel transport position above the ground surface. The raising system could also be provided by a slotted bar, or a stop on the opener arm 47 that engages the wheel arm 117, or like devices could also be used to raise the arm 117 when the opener arm 147 is raised.

In the mounting system illustrated in FIG. 10 the residue wheel pair, again illustrated here only with the right residue wheel 113A', is movably and rotatably mounted to the opener arm 147 by the axle 115 extending through and rotatably mounted in a slot 135 defined in an axle bracket 137 that extends down from the opener arm 147. When the opener arm 147 moves up the shanks 105 move up to a shank transport position, the axle 115 hits the bottom of the slot 135 and moves up to a wheel transport position above the ground surface 111.

Figure 11:
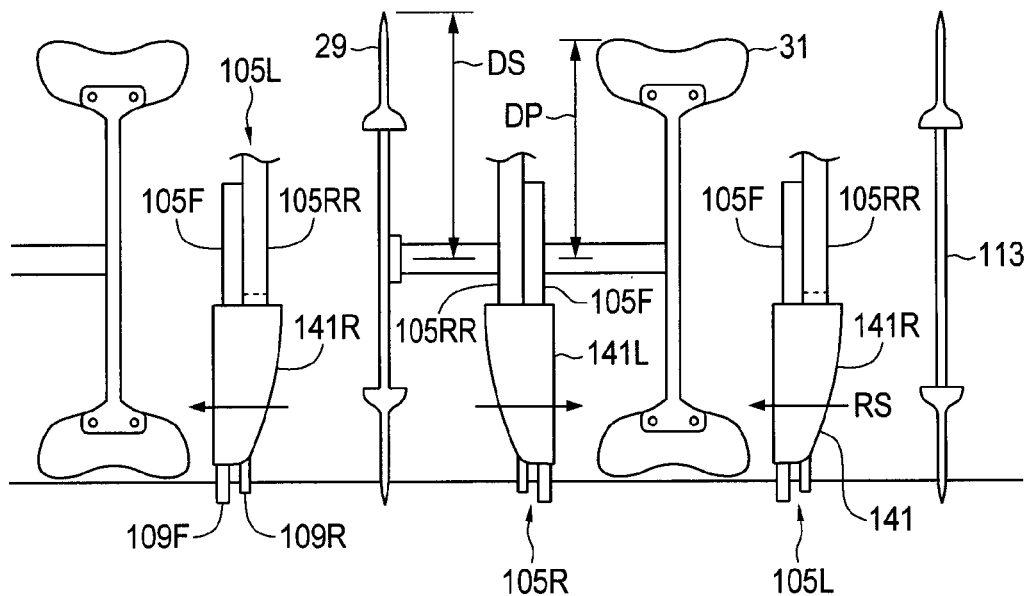
FIG. 11 is a schematic front view of a portion of the embodiment of FIG. 9 showing a deflecting shield mounted on the front furrow opener.

As schematically illustrated in FIG. 11 the rear shank 105RR is offset to a first side of the front shank 105F. A deflecting shield 141 can be mounted on the front shank 105F to direct residue in direction RS toward a second side of the front shank 105 opposite the rear shank 105RR, and wherein the residue contact members 125 on the residue wheel 113 engage the ground surface on the second side of the front shank 15. The shank assemblies in FIG. 11 are right shank assemblies 105A, where the rear shank 105RR is offset to the right of the front shank 105F, and left shank assemblies 105B, where the rear shank 105RR is offset to the left of the front shank 105F. Thus the right deflecting shields 141R are mounted on the front shank of the left shank assemblies 105L and the left deflecting shields 141L are mounted on the front shank of the right shank assemblies 105RR.

The double shank assemblies comprising front and rear shanks 105F, 105RR mounted on an opener arm 147 can be used to provide the shanks 5 illustrated in FIGS. 1-4 and described above.

Figure 12:
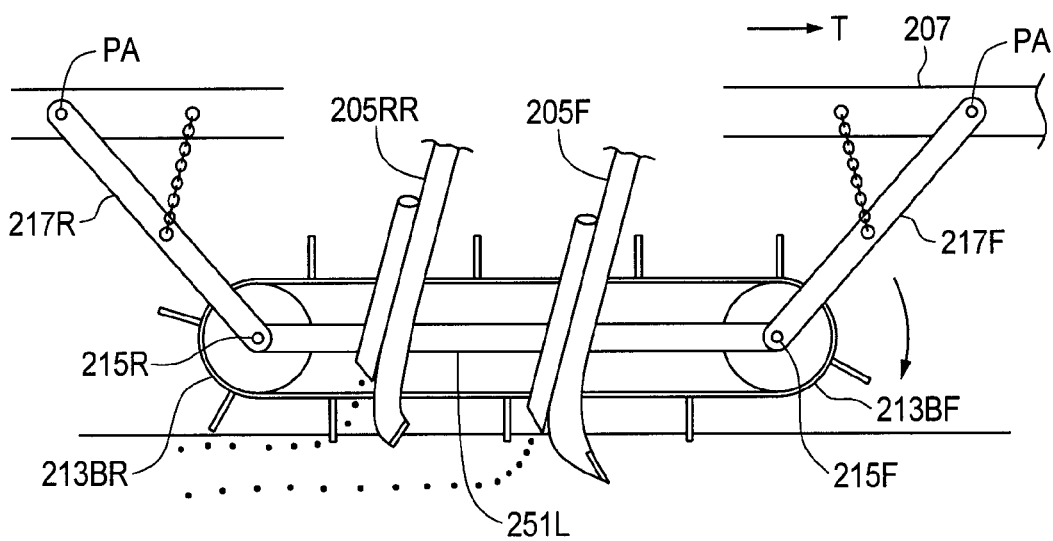
FIG. 12 is a schematic side view of a further alternate embodiment of a residue clearing apparatus of the present disclosure for a seeding implement comprising a track mounted on front and rear residue wheel pairs where the residue contact members extend from the track.
Figure 13:
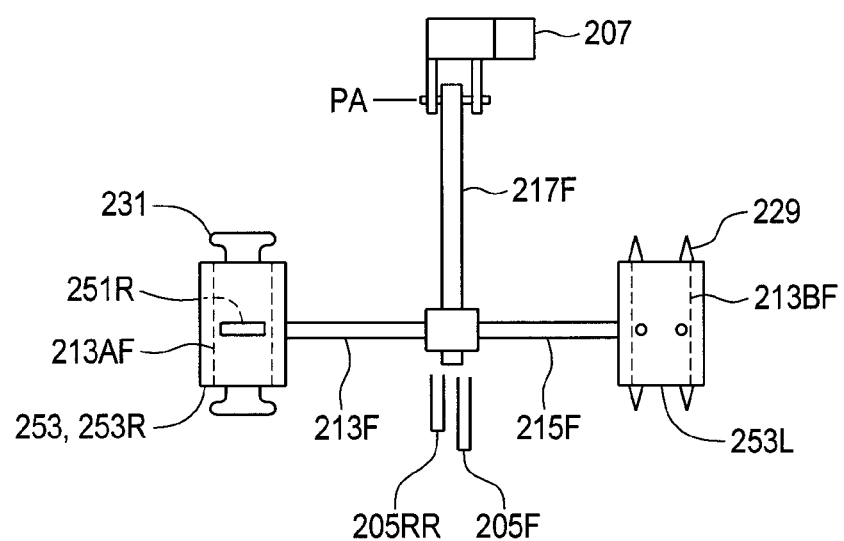
FIG. 13 is a schematic front view of the embodiment of FIG. 12.

FIGS. 12 and 13 schematically illustrate a residue clearing apparatus 201 comprising the axles 215F, 215R of front and rear residue wheel pairs, illustrated in FIG. 12 with the left residue wheels 213BF, 213BR rotatably mounted to front and rear ends of corresponding right and left track frames 251R, 251L, and corresponding right and left tracks 253R, 253L mounted on the front and rear residue wheels 213F, 213R. The residue contact members 225, provided by spikes 229, paddles 231, and the like, extend outward from the tracks 253 adjacent to the front and rear shanks 205F, 205RR mounted on a seeding implement, for example on an opener arm as illustrated in FIGS. 9 and 10. The front and rear axles 215F, 215R are rotatably mounted at middle portions thereof in lower ends of corresponding front and rear wheel arms 217F, 217R, and an upper end of each wheel arm 217 is pivotally attached about pivot axes PA to the frame 207 of the seeding implement, or alternately as schematically illustrated in FIG. 9, to an opener arm.

The disclosed residue clearing apparatus improves the flow of residue between shanks of a seeding implement. Shanks can be spaced closer together significantly reducing the cost and complexity of the seeding implement.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A residue clearing apparatus for a seeding implement, where the seeding implement comprises a plurality of shanks substantially equally spaced along a width of a frame of the seeding implement and a hoe furrow opener mounted on a bottom end of each shank and configured to engage a ground surface, the apparatus comprising:

a plurality of residue wheel pairs, each residue wheel pair comprising a right residue wheel and a left residue wheel mounted to corresponding right and left ends of a rigid axle;

wherein each axle is adapted to be movably and rotatably mounted to the seeding implement with the right and left residue wheels on corresponding right and left sides of one of the shanks such that each residue wheel pair moves up and down independent of the shanks;

a plurality of residue contact members connected to each residue wheel and configured to engage the ground surface adjacent to the one of the shanks to rotate the residue wheels, and wherein outer ends of the residue contact members pass forward of the shank above the furrow opener;

a raising system operative to raise the residue wheel pairs to a wheel transport position;

wherein the right residue wheel of a first residue wheel pair is connected to the left residue wheel of an adjacent second residue wheel pair such that rotation of the right residue wheel of the first residue wheel pair causes rotation of the left residue wheel of the adjacent second residue wheel pair.

2. The apparatus of claim 1 wherein the residue contact members are provided by one of a spike and a paddle extending outward from a periphery of the residue wheels.

3. The apparatus of claim 2 wherein the spike comprises a pair of right and left spikes.

4. A residue clearing apparatus for a seeding implement, where the seeding implement comprises a plurality of shanks substantially equally spaced along a width of a frame of the seeding implement and a hoe furrow opener mounted on a bottom end of each shank and configured to engage a ground surface, the apparatus comprising:

a plurality of residue wheel pairs, each residue wheel pair comprising a right residue wheel and a left residue wheel mounted to corresponding right and left ends of a rigid axle;

wherein each axle is adapted to be movably and rotatably mounted to the seeding implement with the right and left residue wheels on corresponding right and left sides of one of the shanks such that each residue wheel pair moves up and down independent of the shanks;

a plurality of residue contact members connected to each residue wheel and configured to engage the ground surface adjacent to the one of the shanks to rotate the residue wheels, and wherein outer ends of the residue contact members pass forward of the shank above the furrow opener;

a raising system operative to raise the residue wheel pairs to a wheel transport position;

wherein the residue contact members on one of the right and left residue wheels of a residue wheel pair comprise a plurality of paddles, each paddle with outer portions thereof curved and oriented such that a center portion thereof is above right and left portions thereof that engage the ground surface, and the residue contact members on the other one of the right and left residue wheels comprise a plurality of spikes, and wherein a distance from the axle to outer ends of the spikes is greater than a distance from the axle to outer ends of the paddles.

5. The apparatus of claim 1 wherein the residue contact members are resilient.

6. The apparatus of claim 1 wherein right and left adjacent shanks are mounted on a lateral frame member of the frame of the seeding implement, and wherein at least one residue contact member comprises a right portion adjacent to a left side of the right shank and a left portion adjacent to a right side of the left shank.

7. The apparatus of claim 6 comprising a left deflecting shield adapted to be mounted on the right shank where same is operative to direct residue toward a left side of the right shank, and a first right deflecting shield adapted to be mounted on the left shank where same is operative to direct residue toward a right side of the left shank, and wherein residue contact members mounted on a first residue wheel engage the ground surface adjacent to the left side of the right shank and adjacent to the right side of the left shank.

8. The apparatus of claim 7 wherein the residue contact members mounted on the first residue wheel comprise paddles, and wherein each paddle has a right portion thereof adjacent to the left side of the right shank and a left portion thereof adjacent to the right side of the left shank, and wherein the paddles extend outward from a periphery of the first residue wheel rotating between the right and left shanks.

9. The apparatus of claim 8 wherein a third shank is mounted on the lateral frame member to the right of the right shank, and comprising a second right deflecting shield adapted to be mounted on the third shank where same is operative to direct residue toward a right side of the third shank, wherein residue contact members mounted on a second residue wheel engage the ground surface between the right shank and the third shank.

10. The apparatus of claim 9 wherein the first and second residue wheels are mounted on the same axle, wherein the residue contact members on the second residue wheel comprise spikes oriented to roll along a line that is substantially equally spaced between the right shank and the third shank, and wherein a distance from the axle to outer ends of the spikes is greater than a distance from the axle to outer ends of the paddles.

11. The apparatus of claim 1 wherein all the shanks on the seeding implement are mounted on a lateral frame member.

12. The apparatus of claim 1 wherein each residue wheel is biased toward the ground surface only by weight.

13. The apparatus of claim 1 wherein on each residue wheel, the residue contact members engage the ground surface rearward of the corresponding adjacent furrow opener.

14. The apparatus of claim 1 wherein the right residue wheel of a first residue wheel pair is connected to the left residue wheel of an adjacent second residue wheel pair by one of:

a universal joint assembly comprising a first universal joint connected to the right residue wheel of the first residue wheel pair and a second universal joint connected to the left residue wheel of the adjacent second residue wheel pair, and a telescoping shaft connecting the first and second universal joints; and a flexible tether connected at one end thereof to the right residue wheel of the first residue wheel pair and connected at an opposite end thereof to the left residue wheel of the adjacent second residue wheel pair.

15. The apparatus of claim 14 further comprising a residue wheel drive connected to the axle of one of the first and second residue wheel pairs and operative to exert a rotational force on the axle to assist in rotating the first and second residue wheel pairs.

16. The apparatus of claim 1 wherein the seeding implement comprises a plurality of opener arms substantially equally spaced along a width of the frame, wherein each arm is pivotally attached to the frame such that the arm can move up and down, and wherein front and rear shanks with corresponding front and rear hoe furrow openers mounted to bottom ends thereof are mounted to each arm, and wherein the residue contact members engage the soil surface between the front and rear hoe furrow openers.

17. The apparatus of claim 16 wherein the axle of each residue wheel pair is adapted to be movably and rotatably mounted to one of the opener arms.

18. The apparatus of claim 16 wherein the rear shank is offset to a first side of the front shank, and comprising a deflecting shield adapted to be mounted on the front shank where same is operative to direct residue toward a second side of the front shank, and wherein the residue contact members engage the ground surface on the second side of the front shank.

19. The apparatus of claim 1 comprising front and rear residue wheel pairs rotatably mounted to corresponding front and rear ends of a track frame, a right track mounted on the right residue wheels of the front and rear residue wheel pairs, and a left track mounted on the left residue wheels of the front and rear residue wheel pairs wherein the residue contact members extend outward from the track and engage the ground surface adjacent to at least one shank.

20. The apparatus of claim 19 wherein the axle of the front residue wheel pair is adapted to be movably and rotatably mounted to the seeding implement independent from the axle of the rear residue wheel pair.

21. The apparatus of claim 1 wherein the raising system is configured such that raising the shanks to a shank transport position causes the residue wheels to rise to the wheel transport position.

22. An apparatus comprising:
a plurality of shanks substantially equally spaced along a width of a frame of a seeding implement and a hoe furrow opener mounted on a bottom end of each shank and configured to engage a ground surface;
a plurality of residue wheel pairs, each residue wheel pair comprising a right residue wheel and a left residue wheel mounted to corresponding right and left ends of a rigid axle;
wherein each axle is movably and rotatably mounted to the seeding implement with the right and left residue wheels on corresponding right and left sides of one of the shanks such that each residue wheel pair moves up and down independent of the shanks;
a plurality of residue contact members connected to each residue wheel and configured to engage the ground surface adjacent to the one of the shanks to rotate the residue wheels, and wherein outer ends of the residue contact members pass forward of the shank above the furrow opener;
a raising system operative to raise the residue wheel pairs to a wheel transport position;
wherein the right residue wheel of a first residue wheel pair is connected to the left residue wheel of an adjacent second residue wheel pair such that rotation of the right residue wheel of the first residue wheel pair is causes rotation of the left residue wheel of the adjacent second residue wheel pair.

23. The apparatus of claim 22 comprising right and left adjacent shanks mounted on a lateral frame member, wherein at least one residue contact member comprises a right portion adjacent to a left side of the right shank and a left portion adjacent to a right side of the left shank.

24. The apparatus of claim 23 comprising a left deflecting shield mounted on the right shank and operative to direct residue toward a left side of the right shank, and a first right deflecting shield mounted on the left shank and operative to direct residue toward a right side of the left shank, and wherein residue contact members mounted on a first residue wheel engage the ground surface adjacent to the left side of the right shank and adjacent to the right side of the left shank.

25. The apparatus of claim 24 wherein the residue contact members comprise a paddle with a right portion thereof adjacent to the left side of the right shank and a left portion thereof adjacent to the right side of the left shank, and wherein the residue contact members extend outward from a periphery of the first residue wheel rotating between the right and left shanks.

26. The apparatus of claim 25 comprising a third shank mounted on the lateral frame member to the right of the right shank, and a second right deflecting shield mounted on the third shank and operative to direct residue toward a right side of the third shank, wherein residue contact members mounted on a second residue wheel engage the ground surface between the right shank and the third shank.

27. The apparatus of claim 26 wherein the first and second residue wheels are a residue wheel pair mounted on the same axle, wherein the residue contact members on the second residue wheel comprise spikes oriented to roll along a line that is substantially equally spaced between the right shank and the third shank, and wherein a distance from the axle to outer ends of the spikes is greater than a distance from the axle to outer ends of the paddles.

28. The apparatus of claim 22 wherein all the shanks on the seeding implement are mounted on a single lateral frame member of the frame of the seeding implement that is oriented substantially perpendicular to an operating travel direction of the seeding implement.

29. The apparatus of claim 22 wherein the shanks are mounted on a plurality of opener arms substantially equally spaced along a width of a frame, wherein each arm is pivotally attached to the frame such that the arm can move up and down, and wherein front and rear shanks with corresponding front and rear hoe furrow openers mounted to bottom ends thereof are mounted to each arm, and wherein the residue contact members engage the soil surface between the front and rear hoe furrow openers.

30. The apparatus of claim 22 wherein the right residue wheel of a first residue wheel pair is connected to the left residue wheel of an adjacent second residue wheel pair by one of:
a universal joint assembly comprising a first universal joint connected to the right residue wheel of the first residue wheel pair and a second universal joint connected to the left residue wheel of the adjacent second residue wheel pair, and a telescoping shaft connecting the first and second universal joints;
a flexible tether connected at one end thereof to the right residue wheel of the first residue wheel pair and connected at an opposite end thereof to the left residue wheel of the adjacent second residue wheel pair.

* * * * *